(12) United States Patent
Borgen et al.

(10) Patent No.: US 8,595,148 B1
(45) Date of Patent: Nov. 26, 2013

(54) METHOD AND SYSTEM FOR APPLICANT SALARY AND EMPLOYMENT HISTORY VERIFICATION

(75) Inventors: Joshua Aaron Borgen, Fremont, CA (US); Todd Matthew Fitch, Santa Clara, CA (US)

(73) Assignee: Intuit Inc., Mountain View, CA (US)

( * ) Notice: Subject to any disclaimer, the term of this patent is extended or adjusted under 35 U.S.C. 154(b) by 476 days.

(21) Appl. No.: 12/130,940

(22) Filed: May 30, 2008

(51) Int. Cl.
*G06Q 99/00* (2006.01)

(52) U.S. Cl.
USPC ...... 705/321; 705/7.42; 705/26.64; 705/26.5; 705/345; 705/415

(58) Field of Classification Search
None
See application file for complete search history.

(56) References Cited

U.S. PATENT DOCUMENTS

| | | | |
|---|---|---|---|
| 6,430,556 B1 * | 8/2002 | Goldberg et al. | 1/1 |
| 6,820,135 B1 * | 11/2004 | Dingman et al. | 709/246 |
| 6,862,596 B2 | 3/2005 | Thomsen | |
| 7,376,569 B2 | 5/2008 | Plunkett et al. | |
| 7,386,507 B2 * | 6/2008 | Davis et al. | 705/38 |
| 7,630,986 B1 * | 12/2009 | Herz et al. | 1/1 |
| 2001/0029482 A1 * | 10/2001 | Tealdi et al. | 705/38 |
| 2001/0047347 A1 * | 11/2001 | Perell et al. | 707/1 |
| 2002/0069081 A1 * | 6/2002 | Ingram et al. | 705/1 |
| 2002/0143752 A1 | 10/2002 | Plunkett et al. | |
| 2002/0198824 A1 | 12/2002 | Cook | |
| 2003/0004748 A1 | 1/2003 | Coleman et al. | |
| 2003/0009418 A1 * | 1/2003 | Green et al. | 705/38 |
| 2003/0212790 A1 * | 11/2003 | Thambidurai et al. | 709/225 |
| 2004/0073539 A1 * | 4/2004 | Dettinger et al. | 707/3 |
| 2004/0158513 A1 * | 8/2004 | Musacchio | 705/32 |
| 2006/0026075 A1 * | 2/2006 | Dickerson et al. | 705/26 |
| 2006/0281469 A1 * | 12/2006 | Stoller et al. | 455/456.1 |
| 2007/0094104 A1 * | 4/2007 | Reahard | 705/28 |
| 2007/0106626 A1 * | 5/2007 | Mundie et al. | 706/20 |
| 2007/0112598 A1 * | 5/2007 | Heckerman et al. | 705/2 |
| 2008/0086759 A1 * | 4/2008 | Colson | 726/2 |
| 2008/0170443 A1 * | 7/2008 | Jung et al. | 365/185.22 |
| 2009/0012884 A1 * | 1/2009 | Harman et al. | 705/31 |

\* cited by examiner

*Primary Examiner* — Fateh Obaid
(74) *Attorney, Agent, or Firm* — Osha Liang LLP (57) ABSTRACT

The invention is directed to a method and system to verify an employment history of an applicant. The method involves obtaining data from a plurality of data sources comprising a business application, aggregating data to obtain aggregated data, where aggregated data includes employment and payroll data from the plurality of data sources, receiving a request for an employment history verification report based on a job application, where the request includes applicant identification information, searching aggregated data for data associated with applicant identification information, and providing the employment history verification report corresponding to applicant identification information, where the employment history verification report is based on the request and aggregated data. The employment history verification report may be based on employment and payroll data associated with applicant identification information.

16 Claims, 5 Drawing Sheets

METHOD AND SYSTEM FOR APPLICANT SALARY AND EMPLOYMENT HISTORY VERIFICATION

BACKGROUND

The job market is an extremely competitive environment, and many employers strive to negotiate the hiring process in as efficient a manner as possible. Regulations and business practices limit the manner in which employers and references services may verify employment history information during the hiring process. Moreover, most employment and compensation information is considered to be highly private and laws prohibit dissemination of this information without an individual's consent. As a result, this type of information, though valuable to businesses, is generally not aggregated for research purposes.

With advances in computer-related business technology, many businesses now manage their payroll systems using one or more business applications, and maintain electronic employment and payroll records. In addition, the search for employment is more and more frequently conducted in an online environment. Job applications are frequently submitted through a company's website or professional job board, and interviews may now be conducted at virtual job fairs. This means that job candidates from all over the world can apply for a single position. Although applicants may appear qualified on paper, employers must verify this information. Despite all the advances in business communications, this employment verification process remains challenging.

SUMMARY

In general, in one aspect, the invention relates to a method for verifying an employment history of an applicant. The method comprises obtaining data from a plurality of data sources, wherein data comprise employment and payroll data, and the plurality of data sources comprises a plurality of business applications, aggregating data to obtain aggregated data, wherein aggregated data comprise employment and payroll data from the plurality of data sources, receiving a request for an employment history verification report based on a job application, wherein the request comprises applicant identification information, searching aggregated data for data associated with applicant identification information, and providing the employment history verification report based on the request and aggregated data. In one embodiment, the employment history verification report comprises employment and payroll data associated with applicant identification information. Alternatively, in one embodiment, the employment history verification report comprises a comparative analysis of the employment history from the job application and aggregated data.

In general, in one aspect, the invention relates to a method for verifying an employment history comprising obtaining a job application from an applicant, wherein the job application comprises applicant identification information, submitting a request for an employment history verification report based on the job application, and receiving an employment history verification report corresponding to the applicant identification information, wherein the employment history verification report is based on the request and aggregated data comprising employment and payroll data obtained from a plurality of data sources, and wherein the plurality of data sources comprises a plurality of business applications.

In general, in one aspect, the invention relates to a system to verify an employment history of an applicant. The system comprises an aggregate data repository configured to store aggregated data, wherein aggregated data comprise employment and payroll data from a plurality of data sources comprising a plurality of business applications. The system further comprises a data processing service configured to receive a request for an employment history verification report based on a job application, wherein the request comprises applicant identification information, extract, from the aggregate data repository, data associated with applicant identification information, and generate an employment history verification report corresponding to the applicant identification information, wherein the employment history verification report is based on the request and aggregated data.

In general, in one aspect, the invention relates to a computer readable medium comprising a plurality of executable instructions for generating an employment history verification report. The computer readable medium comprises instructions to obtain data from a plurality of data sources, wherein data comprise employment and payroll data, and the plurality of data sources comprises a plurality of business applications, aggregate data to obtain aggregated data, wherein aggregated data comprise employment and payroll data from the plurality of data sources, receive a request for an employment history verification report based on a job application, wherein the request comprises applicant identification information, search aggregated data for data associated with applicant identification information, and provide the employment history verification report based on the request and aggregated data.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

In general, embodiments of the invention provide a method and system for providing an employment history verification report. Data from multiple sources are aggregated, and the aggregated data are used to verify an employment history provided by a job applicant, such as current and former employers, a salary history, job title(s), and/or other related employment information. The aggregated data may also be used to identify periods of unemployment or disability for the job applicant, or discrepancies between the reported employment history and actual business records.

Figure 1:
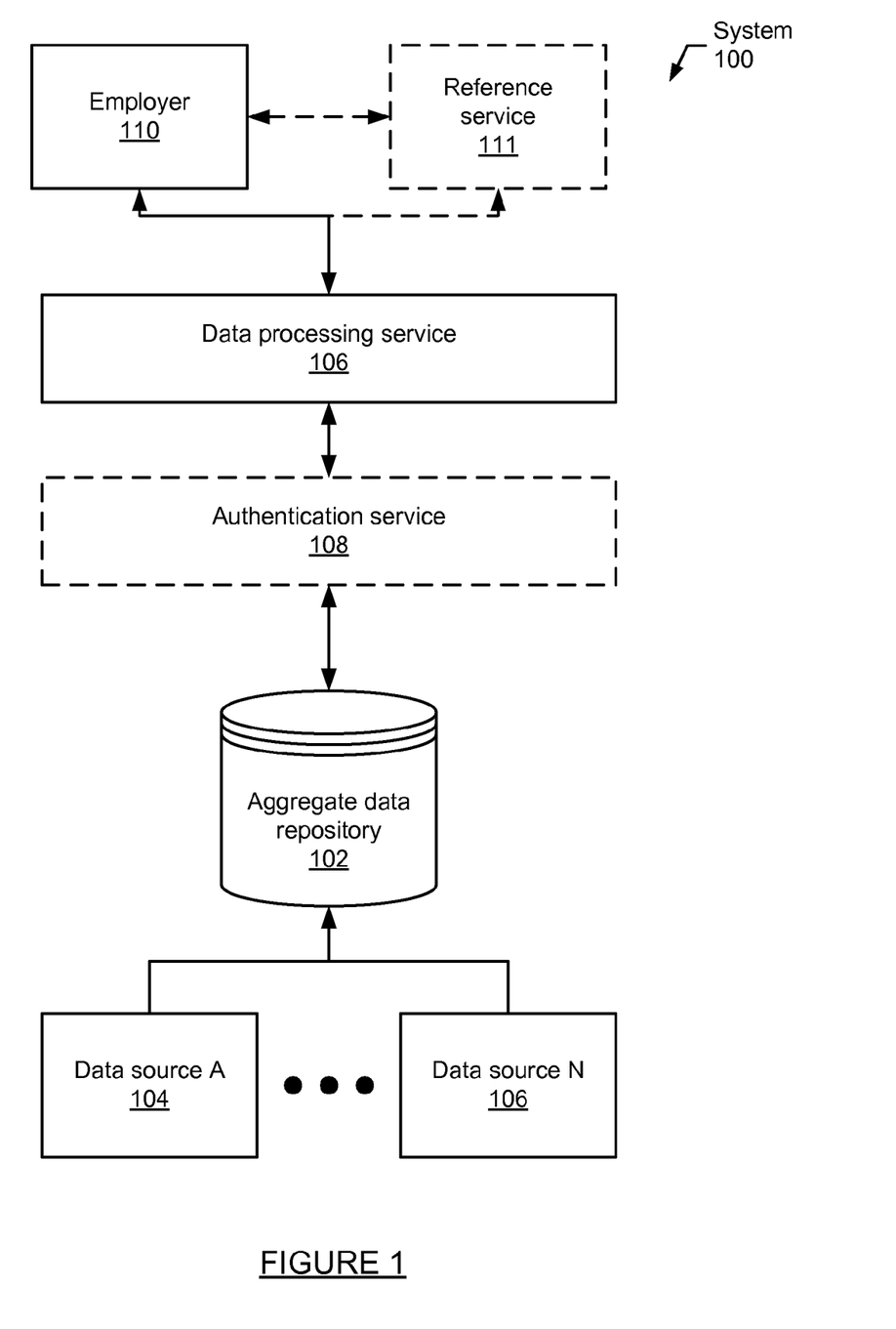
FIGS. 1-2 show diagrams of systems in accordance with one or more embodiments of the invention.

FIG. 1 shows a diagram of a system (100) in accordance with one or more embodiments of the invention. The system (100) includes multiple data sources (e.g., data source (104) and data source N (106)) configured to provide data to an aggregate data repository (102). The aggregate data repository (102) is referred to as "aggregate" because it is configured to store aggregated data from the data sources. For the purposes of this discussion, "aggregated" means "grouped together." For example, if the aggregate data repository (102) is a database, data from the data sources may be grouped together in one or more tables of the database. Alternatively, aggregated data may be grouped together as cells in a spreadsheet, fields of an extensible markup language (XML) document, or in any other aggregated format. Those skilled in the art will appreciate that data may be stored and aggregated in many different ways.

In one or more embodiments of the invention, the data sources include one or more business applications. Business applications are software products that provide functionality for managing business operations. For example, the data sources may include one or more financial management applications used to manage payroll and/or paycheck data for a business. Further, data from the data sources may include demographic information about the businesses, such as name, location, industry, number of employees at each location, or any other type of demographic information about the businesses. In one or more embodiments of the invention, individuals, businesses, and/or payroll processing companies may upload data to one or more application data repositories associated with the data sources (discussed below).

Further, the data sources may be managed by one or more employers (individuals or companies), research companies, professional networks, government organizations, educational facilities, accreditation services, and/or financial institutions, such as banks, lending institutions, credit bureaus, tax agencies, etc. In general, the data sources may include any type of source configured to provide information about company payroll information and an individual's employment history. Many different types of payroll, records management, credentialing, research, and employment data may be used.

Data sources that may be used include, for example, QuickBooks®, Quicken®, TurboTax®, ProSeries®, services provided by a professional network (e.g., LinkedIn®), research organizations (e.g., LexisNexis®, Westlaw®), the U.S. Patent and Trademark Office or unofficial intellectual property reporters, the Internal Revenue Service, the Social Security Administration, the Veterans' Association, state and federal criminal authorities, state and federal courts, newspapers, Internet search engines, or any other type of data source configured to provide data about individuals and/or employment data. The aforementioned data sources are listed as examples only and should not be construed as limiting the scope of the invention. QuickBooks®, Quicken®, TurboTax®, and ProSeries® are registered trademarks of Intuit, Inc. LinkedIn® is registered trademark of LinkedIn Corporation. LexisNexis® is a registered trademark of LexisNexis. Westlaw® is a registered trademark of Thomson West.

As used herein, the terms "employment history" and "employment data" include information relevant to an individual's employment and professional activities, such as current and previous employers, compensation history, job titles, professional awards, professional accomplishments (e.g., inventorship credit, publications, speaking engagements, etc.), educational history, professional certification or registration, professional or client contacts, professional memberships or affiliations, standing with a professional organization (e.g., good standing, disbarment, debarment, inactive status, etc.), fines and sanctions levied, warning letters, pending criminal or civil actions, convictions or judgments, social security information (e.g., the date of issuance of a social security number provided by the applicant), wage garnishments, tax information, unemployment and disability information, reference(s) to the applicant in a professional network, and/or any other data that may be relevant to an employer.

As used herein, the terms "payroll data" and "paycheck data" include types of information generated by employers (or tracked by employees) with respect to compensation. For example, such data may include employee identification data, dates of payments, amounts of payments, purpose of a payment (e.g., bonus, special pay, reason for bonus, severance pay, disability, unemployment, etc.), tax and tax rate information, wage garnishments, and the like.

As used herein, the term "employment history verification report" includes a comparative analysis of employment data and other information provided by a job applicant and data associated with the job applicant from the aggregated data. For example, the employment history verification report may contain information verifying or noting discrepancies in employers, employment dates, salary information, job titles, bonus data, or other employment data provided by a job applicant. The comparison may be based on, for example, payroll data submitted by one or more current or former employers of the applicant, or the applicant himself/herself, from which the applicant's dates of employment and salary information may be calculated. The comparative analysis may be presented as a complete or partial description of all employment and/or payroll data associated with a particular job applicant, or limited to information concerning discrepancies found. Those skilled in the art will appreciate that the comparison information for the employment history verification report may be presented in numerous ways without departing from the spirit and/or scope of this invention.

Continuing with discussion of FIG. 1, requests for an employment history verification report may be made directly by an employer (110), or through a reference service (111). For example, the employer (110) may host a website allowing job applicants to enter their employment history into data fields of a website, and this job application may be directly linked to a data processing service (106). Alternatively, for example, the website may be linked to a web page hosted by a reference service (111), and, directly or indirectly, to a data processing service (106). In any case, some or all of the applicant employment history is provided to the data processing service (106). Those skilled in the art will appreciate that the applicant employment history may be presented in numerous ways without departing from the spirit and/or scope of this invention.

In one or more embodiments, the system (100) includes one or more data processing services (e.g., data processing service (106)). The data processing services are configured to generate one or more matches or identify discrepancies between a job applicant and payroll data and/or any other type of information stored in the aggregate data repository (102).

In view of the above, in one or more embodiments, the data sources may be thought of as input services for the aggregate data repository (102), because the data sources are used to input data to the aggregate data repository (102). Further, in one or more embodiments, the data processing services may be thought of as output services for the aggregate data repository (102), because the data processing services generate output based on the data in the aggregate data repository (102). Specifically, the data processing services generate output in the form of an employment history verification report, and may also be configured to generate other types of output based on data from the aggregate data repository (102). In one or more embodiments, the aggregate data repository (102) is communicatively coupled with application programming interfaces (APIs) (not shown) that allow input services and/or output services to interact with the aggregate data repository (102).

In one or more embodiments of the invention, access to the aggregate data repository (102) is restricted using an authentication service (108). Specifically, the authentication service (108) is configured to ensure that only authorized data processing services are given access to the aggregate data repository (102). For example, the authentication service (108) may require a data processing service to present a username and/or password, an encrypted digital signature, or any other type of authorization credential recognized as valid by the authentication service (108). In one or more embodiments, the aggregate data repository (102) is located in a local area network (LAN) and the authentication service (108) includes a firewall protecting the LAN from unauthorized access.

Figure 2:
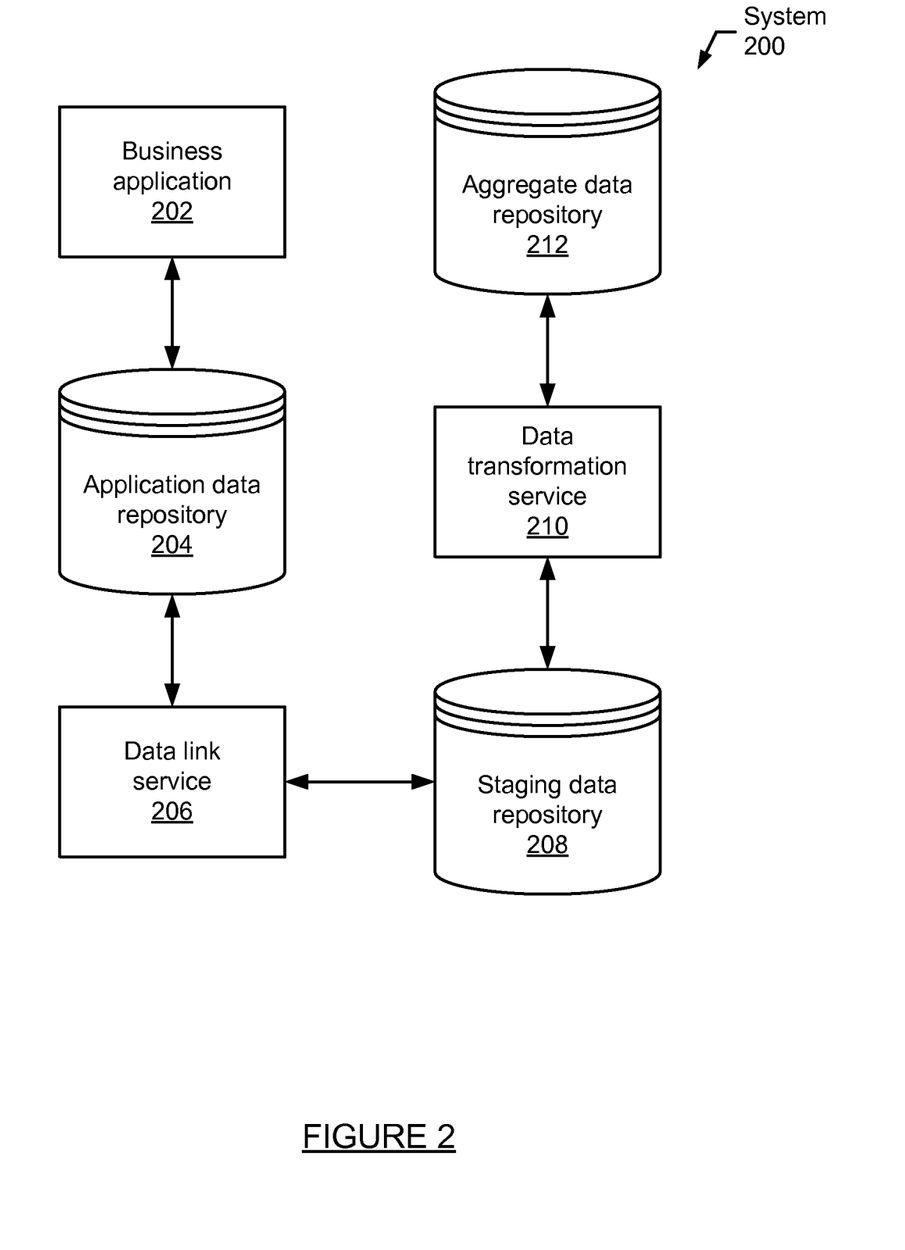

As discussed above, the data sources diagrammed in FIG. 1 may include one or more business applications. FIG. 2 shows a diagram of a system (200) that includes a business application (202) in accordance with one or more embodiments of the invention. The business application (202) may be a financial management application, a payroll application, a research application, a credit analysis application, a professional network application, a search engine, or any other type of business application configured to provide data relating to an individual's employment history or professional achievements.

In one or more embodiments of the invention, data from the business application (202) are stored in an application data repository (204). The application data repository (204) may be a database, an XML document, a spreadsheet, a text file, or any other type of repository configured to store data associated with the business application (202). Some examples of data that may be stored are described above.

In one or more embodiments of the invention, before data from the application data repository (204) are transmitted to an aggregated data repository (212), the data are transformed to a format compatible with the aggregate data repository (212). As one example, if the aggregate data repository (212) is a database, the data may require normalization to conform to a database schema used by the aggregate data repository (212). As another example, the data may require transformation to a particular XML format. Many different types of data transformation may be required, depending on the implementations of the application data repository (204) and the aggregate data repository (212).

In one or more embodiments of the invention, to transform the data to a compatible format, the data are transmitted to a staging data repository (208) using a data link service (206). In one or more embodiments, the data link service (206) is a module or plug-in of the business application (202). Alternatively, the data link service (206) may be independent of the business application (202). In either case, the data link service (206) is configured to retrieve data from the application data repository (204) and transmit the data (for example, over a file system and/or network) to the staging data repository (208).

Further, in one or more embodiments, the data link service (206) is configured to retrieve only a subset of the data available in the application data repository (204). For example, if the application data repository (204) is configured to store a business's financial data, the data link service (206) may omit data that concerns the business and is unrelated to employees, such as a credit card number, a bank account number, or any other type of private data. Alternatively, private business data may be transmitted to the aggregate data repository (212), and privacy of the data may be enforced by another component of the system (200), such as an authentication service (not shown) communicatively coupled with the aggregate data repository (212).

In one or more embodiments of the invention, once the data are stored in the staging data repository (208), the data are transformed to the required format by a data transformation service (210) and the transformed data are transmitted to the aggregate data repository (212). Data stored in the aggregate data repository (212) may then be used to provide an employment history verification report, as discussed herein.

While the system (200) shown in FIG. 2 includes several different components, embodiments of the invention may be envisioned that omit one or more of these components. For example, in one or more embodiments, the data link service (206) is configured to transmit data directly to the data transformation service (210). In such cases, use of the staging data repository (208) may not be required. Further, the business application (202) may be configured to generate data in a format that is already compatible with the aggregate data repository (212). In such cases, use of the data transformation service (210) may not be required.

Moreover, the business application (202) may be configured to store data directly in the aggregate data repository (212). For example, the business application (202) may be a web-based application configured to use the aggregate data repository (212) for data storage. In such cases, the application data repository (204) and data link service (206) may not be required. Alternatively, the system (200) may be logically separated into client-side and server-side components. For example, the business application (202), application data repository (204), and/or data link service (206) may be executing on an end-user's computer system, and the staging data repository (208), data transformation service (210), and/or aggregate data repository (212) may be executing on one or more other computer systems separated from the end-user's computer system by a network.

Many different embodiments of the system (200) may be envisioned that remain within the scope of the invention. Further, while the system (200) has been described with respect to a business application (202), a similar system may be envisioned that uses an application operated by a staffing company, a financial institution, or any other type of application configured to store data relevant to providing employment history, career achievement information, or payroll data.

Figure 3:
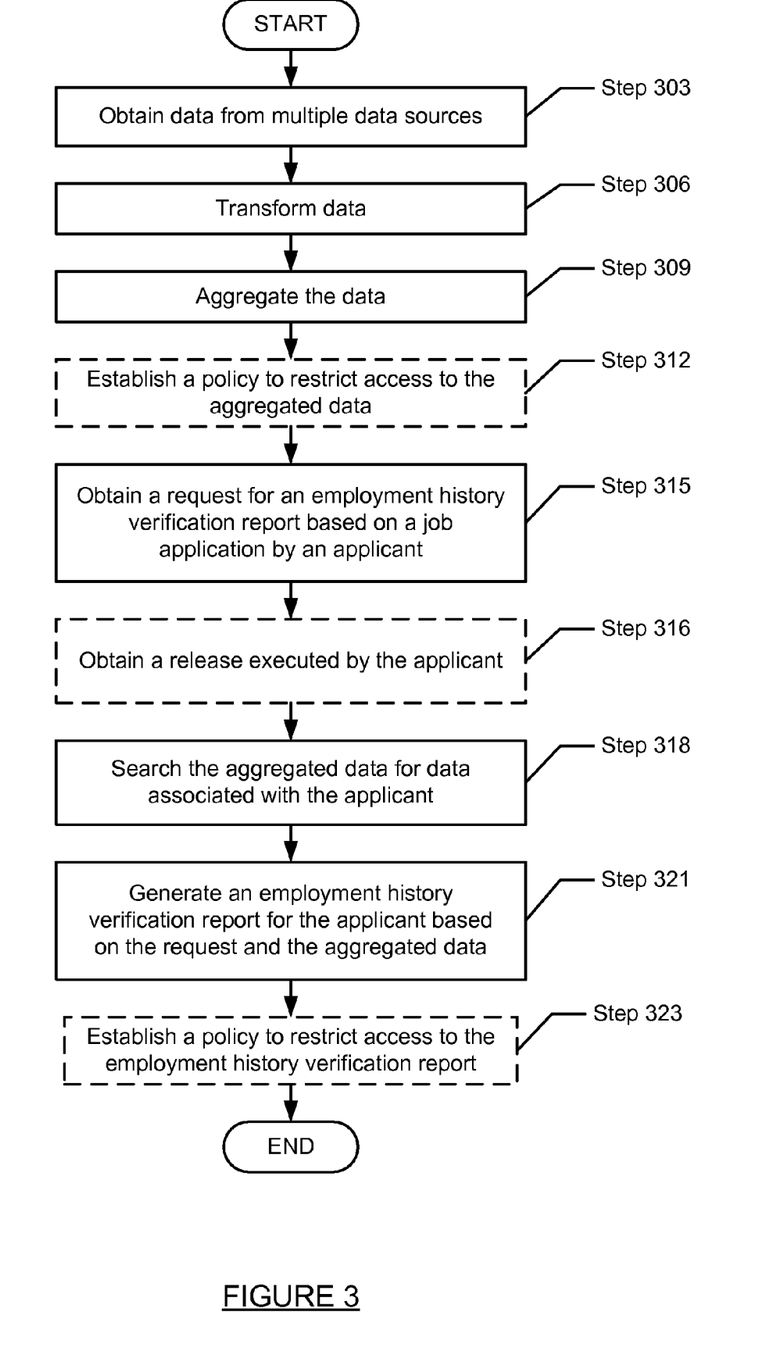
FIGS. 3-4 show flowcharts of a method for requesting an employment history verification report based on the aggregated data.

FIG. 3 shows a flowchart of a method for providing an employment history verification report based on aggregated data in accordance with one or more embodiments of the invention. In one or more embodiments of the invention, one or more of the steps shown in FIG. 3 may be omitted, repeated, and/or performed in a different order than the order shown in FIG. 3. Accordingly, embodiments of the invention should not be considered limited to the specific arrangement of steps shown in FIG. 3.

As shown in Step 303, in one or more embodiments of the invention, data are obtained from multiple data sources. As discussed above, the data sources may include one or more business applications managed, for example, by individuals, employers, payroll services, employees, research companies, professional networks, government organizations, educational facilities, accreditation services, and/or financial institutions, such as banks, lending institutions, credit bureaus, tax agencies, etc. In general, the data sources may include any type of source configured to provide information about company payroll information and/or an individual's employment history or career achievements. Many different types of payroll and employment data may be used. Examples of data that may be provided by the data sources are described above.

As shown in Step 306, in one or more embodiments of the invention, the data are transformed to a data format that is compatible with an aggregate data repository. For example, as discussed above, the data may be transformed to satisfy a particular database schema or XML format. Further, as discussed above, the data may be transformed using a data transformation service communicatively coupled with the aggregate data repository. In general, in one or more embodiments of the invention, transforming the data allows for data from multiple types of data sources to be aggregated in the aggregate data repository.

As shown in Step 309, in one or more embodiments of the invention, the data are aggregated. As noted above, the term "aggregating" means "grouping together." For example, data may be grouped in one or more tables of the database, cells in a spreadsheet, fields of an extensible markup language (XML) document, or in any other aggregated format. In one or more embodiments of the invention, aggregating the data helps facilitate generating business advice based on data from multiple data sources.

As shown in Step 312, in one or more embodiments of the invention, a policy to restrict access to aggregated data is established. Restricting access to the aggregated data may involve ensuring that only authorized entities (for example, businesses, individuals, and/or government entities) have access to the aggregated data. For example, access may be restricted by enforcing a username and/or password, an encrypted digital signature, or any other type of authorization credential. Further, access may be restricted based on a location of the aggregate data repository in a network. For example, the aggregate data repository may be located in a local area network (LAN) and access may be restricted using a firewall that protects the LAN from unauthorized access. In one or more embodiments of the invention, restricting access to the aggregated data also involves a type of filtering, by limiting access to a particular subset of the aggregated data.

Further, in one or more embodiments of the invention, a policy restricting access to the aggregated data is based on whether an entity has purchased access to the aggregated data. In other words, the right to access the aggregated data may be sold and non-paying entities may not be allowed to access the aggregated data. For example, an entity may purchase the right to query (using Structured Query Language (SQL), a report interface, or any other appropriate query mechanism) the aggregated data or a subset thereof. In one or more embodiments of the invention, the right to access the aggregated data is sold using a subscription model, where the entity purchases access rights for a limited time period or with recurring fees.

Alternatively, a copy of the aggregated data (or a subset thereof) may be provided to the entity in an electronic storage medium. As one example, aggregated data may be packaged in an electronic file and transmitted to the entity via File Transfer Protocol (FTP), email or any other type of electronic transmission. As another example, a data set including the aggregated data (or a subset thereof) may be written to a portable storage medium such as a compact disc (CD), digital video disc (DVD), flash drive, or any other type of portable storage medium given to the purchasing entity. Many different purchase and delivery models may be used to establish policies to access the aggregated data. In one or more embodiments of the invention, the price of access is proportional to the amount of access granted. For example, the right to query all of the aggregated data may cost more than the right to query a subset of the aggregated data (for example, for a particular demographic population).

As shown in Step 315, in one or more embodiments of the invention, a request for an employment history verification report is received. For example, an employer, having received a job application and/or resume from an applicant, may wish to confirm that the applicant did accurately represent his or her employment history. As discussed above, an employment history may include, for example, current and previous employers, a salary history, bonus earned, professional accomplishments (e.g., inventorship credit, publications, speaking engagements, etc.), educational history, professional certification or registration, professional or client contacts, professional memberships or affiliations, standing with regulating organization (e.g., good standing, disbarment, disciplinary action(s), active status, inactive status, etc.), fines and sanctions levied, warning letters, named as a party to criminal or civil actions, tax information, disability information, unemployment information, social security information (e.g., date a social security number was issued), and/or any other data that would be relevant to an employer.

The request may include some or all of the employment history provided by the applicant. In one or more embodiments of the invention, the request includes applicant-identifying information (e.g., name, address, social security number, etc.), employment information (e.g., employers, dates at each position), and/or a salary history. The format of the request may vary. For example, the request may be provided in an electronic, paper, or audio format. An employer may scan a job application or resume received from an applicant, and the information captured (e.g., using optical character recognition (OCR) techniques). In one or more embodiments of the invention, the request is provided via a web-based user interface.

As shown in Step 316, in one or more embodiments of the invention, a release executed by the applicant is also obtained. For example, the release may authorize one or more entities or persons to access the applicant's payroll or paycheck data, and to provide some or all of this information to the employer (directly or through a third party reference service). Like the request, the format of the release may vary depending on the applicable state and federal regulations. For example, the release maybe provided in an electronic, paper, or audio format. In one or more embodiments of the invention, the release is provided via a web-based user interface. In one or more embodiments of the invention, the release is incorporated into the request.

As shown in Step 318, in one or more embodiments of the invention, the aggregated data are searched for data associated with the applicant. For example, the payroll and/or paycheck records of each employer listed in the request may be searched for data associated with the applicant, or the aggregated data may be searched using the applicant's identifying information (e.g., name, social security number, etc.). In one or more embodiments, the search takes place in the data repository and the data may be filtered or clustered in order to reduce search times. For example, the aggregated data may be clustered based on the geographic location of the source (e.g., the employer's address), and the employment history information related to state A may first be matched to aggregated data in the state A cluster, then a comparative search is only (or first) conducted with the aggregated data in the state A cluster. Alternatively, data may first be clustered by time period, and the employment history may first be matched to data in a similar time period cluster, then a comparative search of data is conducted only (or first) in that cluster. Those skilled in the art will appreciate that the search may be conducted in numerous ways without departing from the spirit and/or scope of this invention.

As shown in Step 321, in one or more embodiments, an employment history verification report is generated based on the request and the aggregated data. An employment history verification report includes a comparative analysis of employment data and other information provided by a job applicant and data associated with the job applicant from the aggregated data. In one or more embodiments of the invention, aggregated payroll data are analyzed to recreate an employment history for an applicant. A substantial amount of information is available from payroll data tracked by the applicant, and/or the applicant's current or former employers. For example, payroll data may be used to confirm if the applicant was employed at a particular employer, during the claimed period of time, for a particular salary, as well as information concerning particular aspects of compensation, such as bonuses (e.g., "special pay" taxed at higher rates), pay increases coinciding with purported promotions or changes in responsibility/title, severance pay, disability, unemployment, and/or wage garnishments. Those skilled in the art will appreciate that the comparative analysis for the employment history verification report may be presented in numerous ways without departing from the spirit and scope of this invention.

As shown in Step 323, in one or more embodiments, a policy is established to restrict access to the employment history verification report. The restricted access may be based upon the delivery model used. For example, in one or more embodiments of the invention, the employment history verification report may be provided using a subscription model. With such a model, the policy would only allow valid subscribers access to the appropriate employment history verification report(s).

The subscription may be to a webpage, as noted above, or may take another form. For example, an entity (e.g., an employer seeking to verify employment history information provided by applicants) may purchase a subscription for access to an electronic interface that allows the entity (or a representative thereof) to run the report on demand. Alternatively, reports may be generated by the same entity that controls the aggregate data repository. The report may be distributed by email, paper copy, portable storage medium, File Transfer Protocol (FTP), restricted webpage, or any other physical or electronic distribution medium. The report interface may also include controls to filter the aggregated data used to generate the employment history verification report. In one or more embodiments of the invention, the specific filtering criteria used are based on requests by purchasing employers. Thus, the reports may effectively be customized for the purchasing employers. Many different purchase and delivery models may be used to provide the employment history verification report.

Thus, in one or more embodiments of the invention, depending on the delivery model used, the employment history verification report is provided using some form of security that restricts access by non-paying entities. Specifically, access to the employment history verification report may be restricted using a username and/or password, an encrypted digital signature, network-based security, two or more factor authentication, or any other type of access control. For example, access to the employment history verification report may require logging into a secured webpage. The employment history verification report may then be provided only to entities that have paid to receive the service. In one or more embodiments of the invention, additional measures may be taken to ensure that the employment history verification report is only used by authorized employers for reasonable and legally permissible purposes, and that the privacy rights of the employee whose employment data are disclosed are properly protected.

Figure 4:
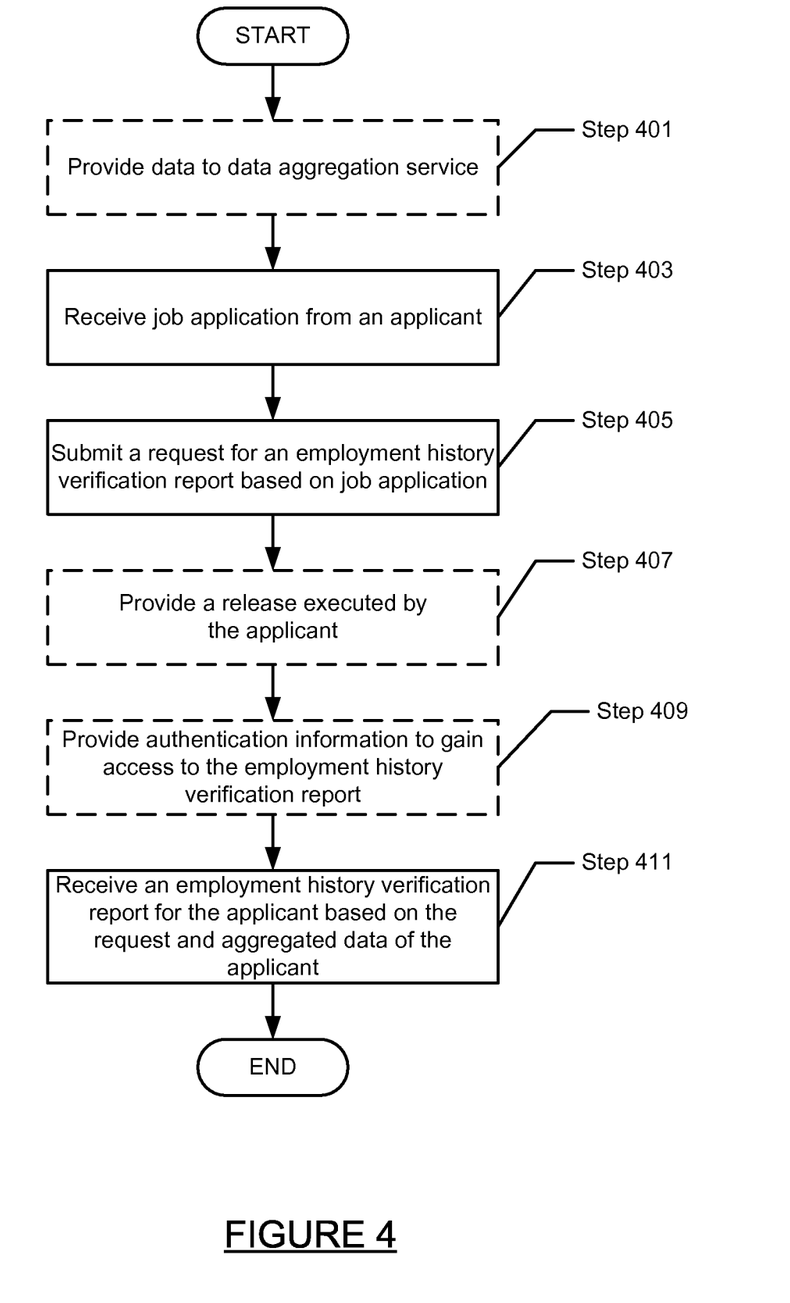

FIG. 4 shows a flowchart of a method for requesting an employment history verification report in accordance with one or more embodiments of the invention. In one or more embodiments of the invention, one or more of the steps shown in FIG. 4 may be omitted, repeated, and/or performed in a different order than the order shown in FIG. 4. Accordingly, embodiments of the invention should not be considered limited to the specific arrangement of steps shown in FIG. 4.

In one or more embodiments of the invention, as shown in Step 401, the data may be provided by multiple data sources. Such provision may be in exchange for access to aggregated data from a business receiving the employment history verification report. That is, in one or more embodiments of the invention, a business supplies the data in exchange for access to search aggregated data and/or receive the employment history verification report. Data from the business may then be included in future analysis of the aggregated data to provide employment history verification reports. In one or more embodiments of the invention, there is no requirement or relationship between the data sources and the employers requesting access to reports generated using the aggregated data.

In one or more embodiments of the invention, as shown in Step 403, an employer receives a job application from an applicant. The format of the job application may vary. For example, the job application may be a paper or electronic application or a resume, it may be received via an online website that allows applicants to fill in data fields and/or upload data, or it may include data provided in an oral interview. The job application may be provided by the applicant directly to the employer (or the employer's website), or may be submitted by a third party reference service (e.g., a recruiter, a job website or job board, an online resume or recruiting service, a talent relationship management (TRM) system, a career fair, etc.). Those skilled in the art will recognize that many different technologies may be used to obtain the job application from an applicant without departing from the spirit and/or scope of this invention.

In one or more embodiments of the invention, as shown in Step 405, the employer (directly or through a third party) submits a request for an employment history verification report based on the job application. Technologies by which such a request may be made have been discussed above. In one or more embodiments of the invention, as shown in Step 407, the employer (or reference service) may additionally provide a release executed by the applicant. As discussed above, the release may authorize one or more entities or persons to access the applicant's payroll and/or paycheck data, and provide some or all of this information to the employer (directly or through a reference service).

In one or more embodiments of the invention, access to the employment history verification report and/or the aggregated data may be restricted. Thus, as shown in Step 409, the employer (or reference service) may be required to provide authentication information (e.g., a user identity and password) in order to access the employment history verification report. Various technologies that may be used to authorize access are discussed above.

In one or more embodiments of the invention, as shown in Step 411, an employer (or third party reference service) may received an employment history verification report based on the request and the aggregated data associated with the application. The employment history verification report may take many forms, as discussed in detail above. For example, the report may simply verify that some or all of the employment data provided by the applicant are accurate, indicate discrepancies between some or all of the employment data provided by the applicant and the aggregated data associated with the applicant (e.g., time period at a particular employer was less than that reported by the applicant, the applicant actually worked for an employer that was not disclosed in the job application, the job applicant's last reported salary information was incorrect, etc.), and/or indicate that no data associated with the applicant was found in the aggregated data (e.g., for a particular time period, a particular employer, or at all).

In one or more embodiments of the invention, the employment history verification report may include data concerning additional professional accomplishments that require verification using third party databases (e.g., research, government, professional association, and educational databases). Additional fees and/or access authorization requirements may be necessary to include this information in the employment history verification report.

In general, embodiments of the invention allow for an employment history verification report to be provided based on aggregated data from multiple sources. Specifically, by aggregating data, historical employment and salary information for an individual employee may be captured, and used to verify an employment history provided by that individual when he/she applies for a job at another company. Further, the employment history verification report may help provide guidance to employers attempting to identify and hire qualified employees for particular positions. Because the aggregated data are obtained from multiple data sources using automated processes, the aggregated data may be very timely and accurate. Thus, the employment history verification report generated using the aggregated data may offer a high degree of reliability. Further, the aggregated data may include data about the applicant's current employer, which may be verified without having to contact a current employer (which job applicants normally do not allow). Therefore, the employment history verification report is very current. Finally, embodiments of the invention may allow for the employment history verification report to be tailored to the specific professional achievements valued by the employer receiving the data.

Figure 5:
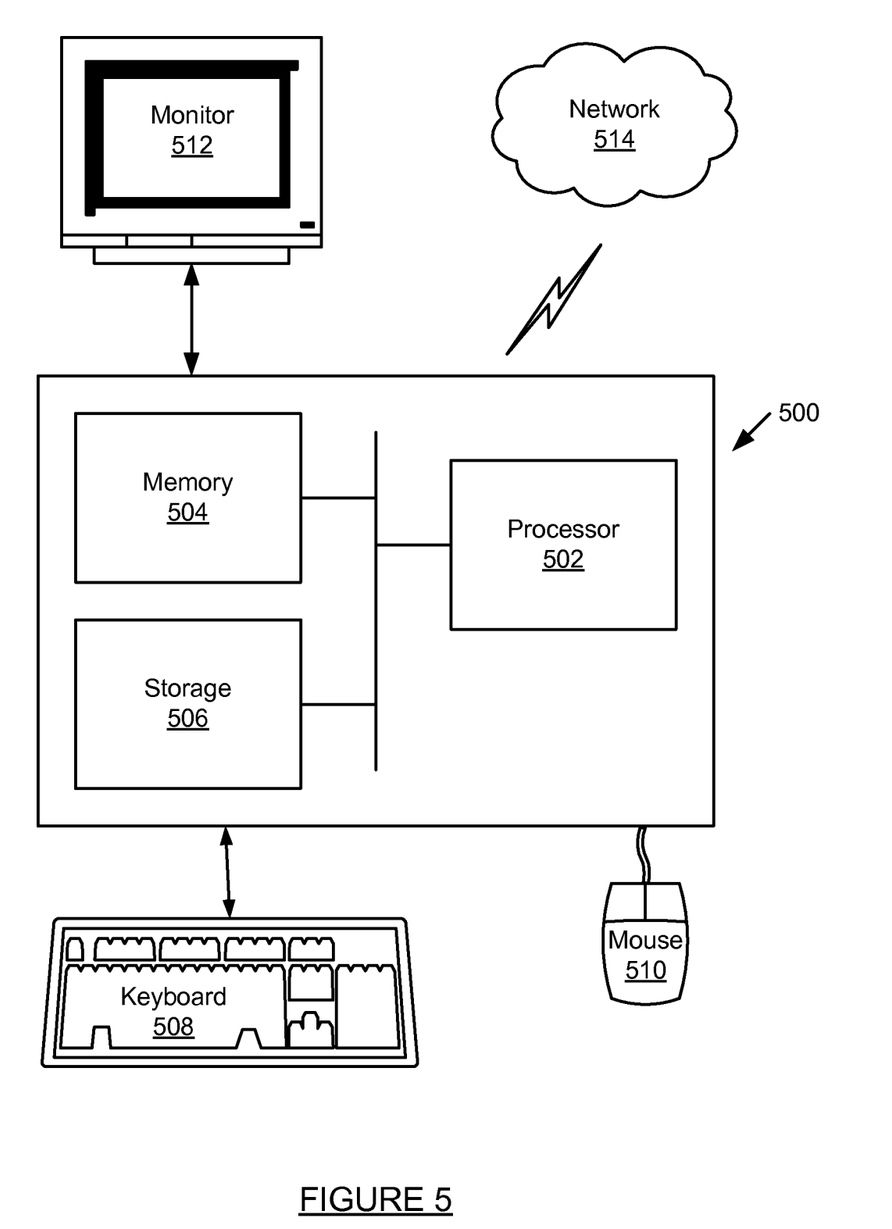
FIG. 5 shows a diagram of a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (for example, a data processing service, authentication service, data filter, aggregate data repository, data source, business application, application data repository, data link service, staging data repository, data processing service, and/or any other portion of the invention) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A computer-implemented method for verifying employment history comprising:

downloading, by a processor and into an aggregate data repository (ADR), a plurality of salary amounts from a plurality of payroll software applications of a plurality of employers, wherein the plurality of salary amounts were paid by the plurality of employers to a plurality of employees;

receiving, by a processor and after downloading the plurality of salary amounts, a request from an employer for an employment history verification report for an employment applicant, wherein the request comprises an identification item identifying the employment applicant;

obtaining a salary history provided by the employment applicant and comprising a plurality of applicant-provided salary amounts corresponding to a plurality of past employers of the employment applicant;

matching, based on the identification item, a subset of the plurality of salary amounts in the ADR to the employment applicant, wherein the subset of the plurality of salary amounts was paid to the employment applicant by the plurality of past employers of the employment applicant;

identifying a discrepancy between the plurality of applicant-provided salary amounts and the subset of the plurality of salary amounts; and generating the employment history verification report comprising the subset of the plurality of salary amounts and the discrepancy.

2. The computer-implemented method of claim 1, further comprising:
searching a third party database for information associated with the request.

3. The computer-implemented method of claim 1, further comprising:
establishing a policy to restrict access to the ADR and the employment history verification report.

4. The computer-implemented method of claim 1, wherein the request further comprises a release from the employment applicant authorizing access to salary data corresponding to the employment applicant.

5. The computer-implemented method of claim 1, further comprising:
providing, to the employer, a subscription to access the ADR.

6. A system to verify employment history, comprising:
a processor;
an aggregate data repository (ADR) comprising a plurality of salary amounts paid by a plurality of employers to a plurality of employees;
a memory operatively connected to the processor, and storing a plurality of instructions comprising functionality to:
download, into the ADR, the plurality of salary amounts from a plurality of payroll software applications of the plurality of employers,
receive, from an employer and after downloading the plurality of salary amounts, a request for an employment history verification report for an employment applicant, wherein the request comprises an identification item identifying the employment applicant,
obtain a salary history provided by the employment applicant and comprising a plurality of applicant-provided salary amounts corresponding to a plurality of past employers of the employment applicant,
match, based on the identification item, a subset of the plurality of salary amounts in the ADR to the employment applicant, wherein the subset of the plurality of salary amounts was paid to the employment applicant by the plurality of past employers,
identify a discrepancy between the plurality of applicant-provided salary amounts and the subset of the plurality of salary amounts, and
generate an employment history verification report comprising the subset of the plurality of salary amounts and the discrepancy.

7. The system of claim 6, further comprising:
an authentication service configured to restrict access to the ADR and the employment history verification report.

8. The system of claim 6, the plurality of instructions further comprising functionality to:
search a third party database for information associated with the identification item.

9. The system of claim 6, wherein the request further comprises a release from the employment applicant authorizing access to salary data corresponding to the employment applicant.

10. The system of claim 6, the plurality of instructions further comprising functionality to:
provide a subscription to access the ADR.

11. A non-transitory computer readable medium storing a plurality of instructions for verifying employment history, the plurality of instructions comprising functionality to:
download, into an aggregate data repository (ADR), a plurality of salary amounts from a plurality of payroll software applications of a plurality of employers, wherein the plurality of salary amounts were paid by the plurality of employers to a plurality of employees;
receive, from an employer and after downloading the plurality of salary amounts, a request for an employment history verification report for an employment applicant, wherein the request comprises an identification item identifying the employment applicant;
obtain a salary history provided by the employment applicant and comprising a plurality of applicant-provided salary amounts corresponding to a plurality of past employers of the employment applicant;
match, based on the identification item, a subset of the plurality of salary amounts in the ADR to the employment applicant, wherein the subset of the plurality of salary amounts was paid to the employment applicant by the plurality of past employers;
identify a discrepancy between the plurality of applicant-provided salary amounts and the subset of the plurality of salary amounts; and
generate the employment history verification report comprising the subset of the plurality of salary amounts and the discrepancy.

12. The non-transitory computer readable medium of claim 11, wherein the request further comprises a release from the applicant authorizing access to salary data corresponding to the employment applicant.

13. The computer-implemented method of claim 1, wherein the identification item is a social security number of the employment applicant.

14. The computer-implemented method of claim 1, further comprising:
downloading, into the ADR and from a regulating organization, a professional membership history of the employment applicant with the regulating organization; and
obtaining an applicant-provided professional membership history provided by the employment applicant, wherein the employment history verification report further comprises a discrepancy between the professional membership history and the applicant-provided professional membership history.

15. The system of claim 6, wherein the plurality of instructions further comprise functionality to:
download, into the ADR and from a regulating organization, a professional membership history of the employment applicant with the regulating organization; and
obtain an applicant-provided professional membership history provided by the employment applicant, wherein the employment history verification report further comprises a discrepancy between the professional membership history and the applicant-provided professional membership history.

16. The non-transitory computer readable medium of claim 11, wherein the plurality of instructions further comprise functionality to:
download, into the ADR and from a regulating organization, a professional membership history of the employment applicant with the regulating organization; and
obtain an applicant-provided professional membership history provided by the employment applicant, wherein the employment history verification report further comprises a discrepancy between the professional membership history and the applicant-provided professional membership history.

\* \* \* \* \*